Oct. 7, 1952 B. A. TREVOR 2,613,271

TUNING INDICATOR FOR FREQUENCY SHIFT TELEGRAPHY

Filed April 7, 1950

INVENTOR
Bertram A. Trevor
BY Harry Tunick
ATTORNEY

Patented Oct. 7, 1952 2,613,271

UNITED STATES PATENT OFFICE 2,613,271

TUNING INDICATOR FOR FREQUENCY SHIFT TELEGRAPHY

Bertram A. Trevor, Riverhead, N. Y., assignor to Radio Corporation of America, a corporation of Delaware Application April 7, 1950, Serial No. 154,650

12 Claims. (Cl. 178—69)

This invention relates to a visual tuning indicator for frequency shift (FS) telegraph receivers. More particularly, it relates to a cathode ray tube turning indicator circuit for such receivers.

Some FS receivers have separate mark and space filters for detection. An example of a three-set diversity receiver of this type is disclosed in my copending application, Serial No. 106,465, filed July 23, 1949. Such a diversity receiver has separate mark and space filters in each of the three diversified channels. In this type of receiver, it is desirable to have the mark-space filter crossover frequency accurately centered between the received mark-space frequencies. Such adjustment allows reception of signals having rather large ranges of frequency shift without the possibility of one of the frequencies falling outside of one of the filter passbands. In FS telegraphy, as is known to those skilled in the art, two frequencies are alternatively present at the receiver. At the transmitter these frequencies are keyed, one frequency representing mark and the other, space.

For visual display purposes, the circuit of this invention utilizes a cathode ray tube. An object of this invention is to devise an indicator circuit wherein the cathode ray tube may be changed without affecting the calibration of the system. This is true in spite of the fact that a large difference in sensitivity may exist between tubes.

Another object is to provide an indicator circuit which will give a very accurate indication of the tuning of an FS telegraph receiver.

The foregoing and other objects of the invention will be best understood from the following description of some examples thereof, reference being had to the accompanying drawing, wherein.

Figures 1, 2, 3:
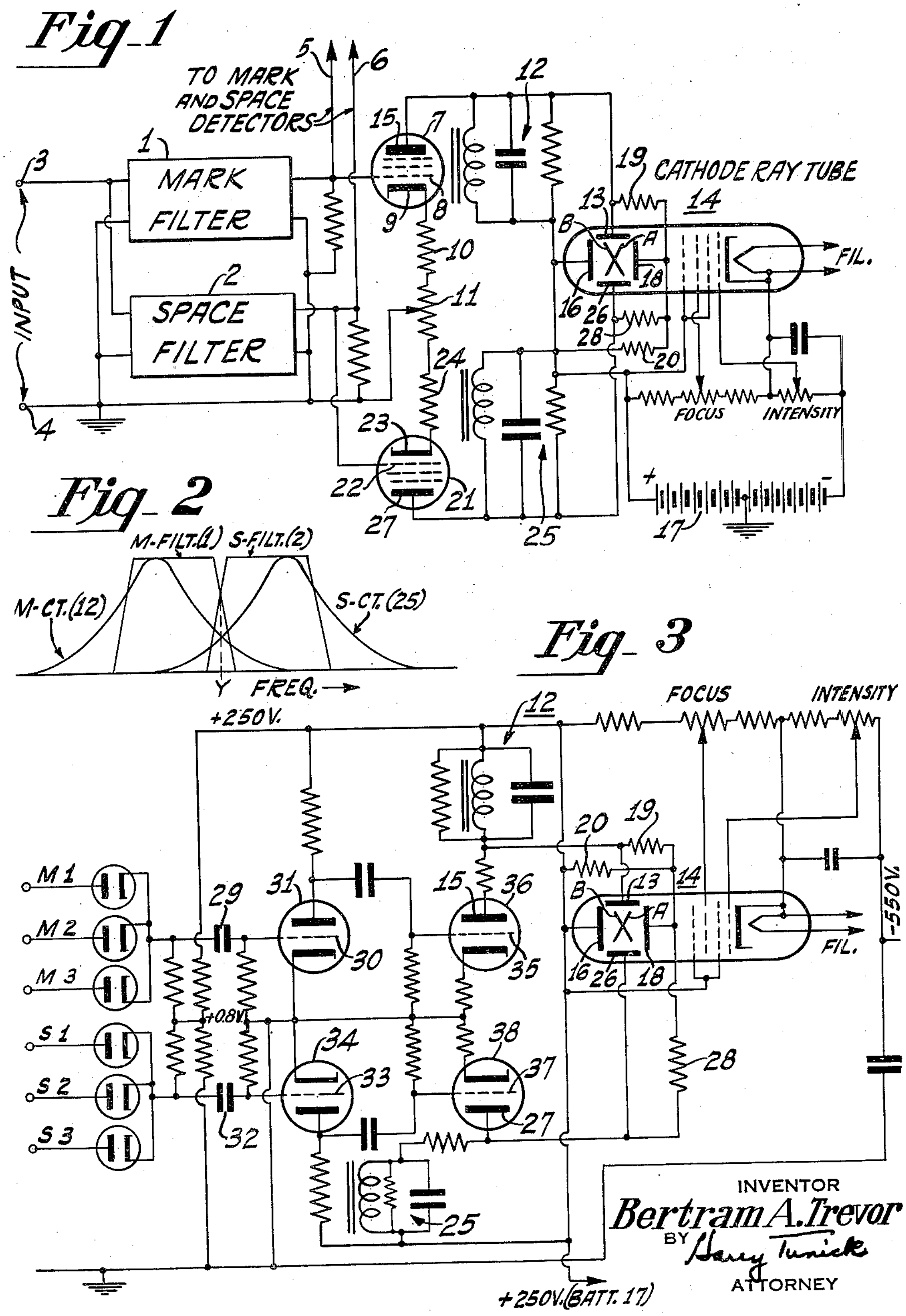
Fig. 1 is a diagrammatic representation of an indicator circuit according to this invention.
Fig. 2 is a set of characteristics useful in explaining the invention.
Fig. 3 is a diagram of the application of the indicator of this invention to an FS diversity receiver.

The objects of this invention are accomplished, briefly, in the following manner: A cathode ray tube having deflecting plates is utilized. The amplified output of the mark filter is connected to supply a large voltage to one vertical deflecting plate and a small voltage to one horizontal deflecting plate. This will produce a slant line on the face of the tube. The amplified output of the space filter is connected to supply a large voltage to the other vertical deflecting plate and a small voltage to said one horizontal deflecting plate. This will produce a line slanted in the opposite direction. With telegraph keying, mark and space signals are alternatively present, displaying an "X" on the tube's face. With correct tuning, a symmetrical narrow "X" results. A frequency displacement in one direction causes one leg of the "X" to increase and the other to decrease in length. A frequency displacement in the other direction reverses the action.

Now referring to Fig. 1, a mark filter 1 and a space filter 2 are connected in parallel to a pair of input terminals 3 and 4. Terminal 4 is grounded. To the terminals 3 and 4 is supplied FS keyed energy from the intermediate frequency stage of an FS receiver. However, if desired, the energy supplied to such terminals may be in the audio range. For example, the space frequency may be 2975 cycles and the mark frequency 2125 cycles. To effect this result, the signal may be heterodyned down to the audio range. It will be appreciated that these discrete mark and space frequencies are alternatively present at terminals 3 and 4 and are keyed to represent intelligence.

One output lead of each of the filters 1 and 2 is grounded. The ungrounded lead of filter 1 is connected at 5 to a mark detector and the ungrounded lead of filter 2 is connected at 6 to a space detector. The connections just mentioned are for signal utilization purposes, so that the intelligence may be made use of.

The output of mark filter 1 is fed to mark amplifier tube 7 by means of a connection of the ungrounded output lead of such filter to control grid 8 of tube 7. The cathode 9 of tube 7 is grounded through resistor 10 and potentiometric resistor 11 the movable tap on which is connected to ground. A mark resonant circuit 12, consisting of an inductance, capacitance and resistance in parallel, is connected to the anode or output circuit of amplifier tube 7. In this way, the mark amplifier tube 7 drives the mark resonant circuit 12 and may thus be considered, together with mark filter 1, as means for applying signals of mark frequency to the selective means 12. When the received mark frequency is 2125 cycles, the resonant frequency of circuit 12 may be 1900 cycles. In general, the resonant frequency of the mark resonant circuit is lower than the received mark frequency. The anode or high potential side of circuit 12 is connected to one of the vertical deflecting plates 13 of a cathode ray tube designated generally by the numeral 14. One side of the resonant circuit 12 is connected to the anode 15 of tube 7. The opposite low potential side of circuit 12 is connected to one horizontal deflecting plate 16 of cathode ray tube 14 and also to positive plate supply 17.

Vertical deflecting plate 13 is connected to the other horizontal deflecting plate 18 of the cathode ray tube through a resistor 19 of rather high resistance, for example 3.3 megohms. The two horizontal deflecting plates 16 and 18 are connected together through a resistor 20, of 1 megohm for example.

Due to the connections of the voltage dividing network so far described, a mark frequency signal will pass through filter 1, be amplified in 7, will pass through circuit 12 and will supply a large voltage to vertical deflecting plate 13 and a small voltage to horizontal deflecting plate 18. This will produce a slant line A on the face of the cathode ray tube.

The output of space filter 2 is fed to space amplifier tube 21 by means of a connection of the ungrounded output lead of such filter to control grid 22 of tube 21. The cathode 23 of tube 21 is grounded through resistor 24 and potentiometric resistor 11, opposite ends of which are connected to cathodes 9 and 23. A space resonant circuit 25, consisting of an inductance, capacitance and resistance in parallel, is connected to the anode or output circuit of amplifier tube 21. In this way, the space amplifier tube 21 drives the space resonant circuit 25 and may thus be considered, together with space filter 2, as means for applying signals of space frequency to the selective means 25. When the received space frequency is 2975 cycles, the resonant frequency of circuit 25 may be 3200 cycles. In general, the resonant frequency of the space resonant circuit is higher than the received space frequency. The anode or high potential side of circuit 25 is connected to the other vertical deflecting plate 26 of cathode ray tube 14. One side of the resonant circuit 25 is connected to the anode 27 of tube 21. The opposite low potential side of circuit 25 is connected to the horizontal deflecting plate 16 of tube 14 and to positive supply 17.

Vertical deflecting plate 26 is connected to horizontal deflecting plate 18 through a resistor 28 of rather high resistance, for example 3.3 megohms.

Due to the connections of the voltage dividing network just described, a space frequency signal will pass through filter 2, be amplified in 21, will pass through circuit 25 and will supply a large voltage to vertical deflecting plate 26 and a small voltage to horizontal deflecting plate 18. This will produce a slant line B on the face of the cathode ray tube.

Line B is slanted in an opposite direction to line A, produced by the mark signal. With telegraph keying, mark and space signals are normally alternatively present, displaying an "X" on the cathode ray tube face.

Fig. 2 shows the frequency response characteristics of the mark and space filters 1 and 2, along with the frequency response curves of the mark and space resonant circuits 12 and 25. The legends for the curves denote the components to which the respective curves apply. It will be observed that, starting from a low frequency and moving upward, the output of the mark resonant circuit 12 increases as the frequency approaches the resonant peak and decreases as the frequency approaches that of the filter crossover point Y. It may be noted, from Fig. 2, that the output of the mark resonant circuit 12 is quite high in the vicinity of the mark frequency (which is below the frequency of the crossover point Y and is approximately in the center of the horizontal portion of the frequency response characteristic of mark filter 1), and is quite low in the vicinity of the space frequency (which is above the frequency of the crossover point Y and is approximately in the center of the horizontal portion of the frequency response characteristic of space filter 2). Therefore, mark resonant circuit 12 may be termed a first selective means for passing signals of mark frequency and attenuating signals of space frequency. In a similar manner, starting from a high frequency and moving downward, the output of the space resonant circuit 25 increases toward resonance and decreases toward the crossover frequency Y. It may be noted, from Fig. 2, that the output of the space resonant circuit 25 is quite high in the vicinity of the space frequency (approximately in the center of the characteristic of space filter 2), and is quite low in the vicinity of the mark frequency (approximately in the center of the characteristic of mark filter 1). Therefore, space resonant circuit 25 may be termed a second selective means for passing signals of space frequency and attenuating signals of mark frequency.

The characteristics of the mark and space resonant circuits 12 and 25 are similar. Therefore, when the mark and space frequencies received are equally disposed about the filter crossover frequency Y, equal voltages appear at the outputs of resonant circuits 12 and 25, making the two lines A and B on the face of the tube 14 of equal length. Thus, under these conditions a symmetrical "X" is displayed on the face of the cathode ray tube.

If, now, the mean of the received mark and space frequencies shifts below the frequency Y, the output of resonant circuit 12 will increase (assuming that the mark frequency is still above the peak of the circuit 12 characteristic in Fig. 2) and that of resonant circuit 25 will decrease. Under these conditions, leg A of the cathode ray tube display "X" will lengthen and leg B will shorten. This will indicate incorrect tuning.

If the mean of the received mark and space frequencies shifts above the frequency Y, the output of resonant circuit 12 will decrease and that of resonant circuit 25 will increase (assuming that the space frequency is still below the peak of the circuit 25 characteristic in Fig. 2). Now, leg A of the cathode ray tube's "X" will shorten and leg B will lengthen, again indicating incorrect tuning.

In this type of FS telegraph receiver, it is desirable, and in fact necessary, to have the crossover frequency Y accurately centered between the received mark-space frequencies. It is necessary to maintain this accuracy of tuning to preserve the proper keying bias. Since the radio frequency signal is heterodyned down to pass through the mark/space filters, the beating oscillator used for tuning must be set to exactly center the mark and space frequencies about the crossover at Y. In high-speed telegraphy, this tuning is very difficult to achieve without a visual indicator of the type disclosed. When the frequency Y is accurately centered between the received mark-space frequencies, signals having rather large ranges of frequency shift may be received properly.

Since by the circuit of this invention, tuning is indicated by the symmetry or nonsymmetry of the "X," or in other words by the length of one leg relative to that of the other leg, the absolute lengths of the legs have nothing to do with the indication. Therefore, the cathode ray tube may be changed without altering the calibration of the system, even though a considerable variation in sensitivity exists between different tubes.

By suitable variation of the values of resistors such as 19, 20 and 28, the cathode ray tube's "X" may be made as narrow as desired. This will allow a very accurate judgment of its symmetry, enabling an accurate setting of the tuning control. In other words, the angle between the legs of the "X" may be made as small as desired.

The connections to the cathode ray tube 14 for producing the electron beam, including the focus and intensity controls, are illustrated in Fig. 1 but are not described in detail herein, since this is a more or less conventional arrangement.

Fig. 1 illustrates the application of this invention to a single FS receiver. The tuning indicator of this invention may be applied to a three-set diversity receiver used for FS telegraphy. Fig. 3 illustrates a circuit of the latter type.

The terminals labeled M1, M2, M3 are fed from the three mark filters of a three-set diversity receiver for FS signals, such as disclosed, for example, in my said copending application. The terminals labeled S1, S2, S3 are fed from the three space filters of such receiver. Each of these terminals is connected to the anode of a separate diode. Instead of using six separate diodes as indicated, three twin diodes, for example of the 6AL5 type, may be used here. The cathodes of the three mark diodes are paralleled and connected through coupling condenser 29 to the control grid 30 of the first half 31 of a first twin triode, for example of the 12AX7 type. The cathodes of the three space diodes are paralleled and connected through coupling condenser 32 to the control grid 33 of the first half 34 of a second twin triode, for example of the 12AX7 type.

In the diversity receiver of my said application, diversity switching takes place, by means of gate tubes, prior to the three mark filters and the three space filters referred to in the preceding paragraph. However, the tuning indicator of this invention must be able to operate from any one of the mark filter outputs and from any one of the space filter outputs. The diode circuit just described allows any of the mark filter outputs to be applied to tube 31 without the necessity of directly paralleling the three mark filter outputs. It is not allowable to parallel the three mark filter outputs, directly, in order to feed a single tube. The diode circuit, in effect, prevents one mark filter output from feeding into the other two mark filter outputs. Similarly, any of the space filter outputs may be applied to tube 34 without the necessity of directly paralleling the three space filter outputs. The diode circuit described prevents one space filter output from feeding into the other two space filter outputs. In other words, the six diodes are supplied in order that the three mark filters and three space filters may operate into the common amplifier input circuits without interaction. In effect, this gives a practical switching device which allows the strongest signal to override the weaker ones, by biasing diode action. A positive cutoff bias, here shown as 0.8 volt, is supplied to the diode cathodes to aid the switching action.

The first half 31 of the first twin triode supplies a rather large signal to the grid 35 of the second half 36 of this triode. Some limiting is provided in this process. Similarly, the first half 34 of the second twin triode supplies a rather large signal to the grid 37 of the second half 38 of this triode. Some limiting is also provided in this process. This limiting serves to keep the amplitude of the cathode ray display at a more constant value in the presence of additions and subtractions of the various signals as passed by the cathodes of the mark and space diodes. Such additions or subtractions may be produced due to the fact that, occasionally, the signals are equally passed by two or three receivers. The phase relations of the several signals may occasionally be such as to give subtractions of the various signals. This limiting would not be necessary for operation with a single receiver.

The mark resonant circuit 12 is in the anode circuit of the second half 36 of the first twin triode. The space resonant circuit 25 is in the anode circuit of the second half 38 of the second twin triode. The connections to the cathode ray tube 14 are the same as in Fig. 1.

The circuit of Fig. 3 operates in the same manner as that of Fig. 1, to produce an "X" on the face of the cathode ray tube. The description of operation will therefore not be repeated. The symmetry or non-symmetry of the cathode ray tube's "X" is an indication of the tuning.

What I claim to be my invention is:

1. A tuning indicator for a frequency shift telegraphy receiver adapted to receive alternatively-present signals of one frequency representing mark and signals of another frequency representing space, comprising first selective means for passing signals of mark frequency and attenuating signals of space frequency, second selective means for passing signals of space frequency and attenuating signals of mark frequency, means for applying signals of mark frequency to said first selective means, means for applying signals of space frequency to said second selective means, a cathode ray tube having means for producing an electron beam, deflecting means operative on said beam, and receptive of the output of said first selective means, for deflecting said beam in one sense in accordance with the output of said first selective means, and deflecting means operative on said beam, and receptive of the output of said second selective means, for deflecting said beam in a different sense in accordance with the output of said second selective means.

2. A tuning indicator in accordance with claim 1, wherein said mark frequency applying means includes a filter for passing said mark frequency and an amplifier.

3. A tuning indicator in accordance with claim 1, wherein said first selective means comprises a resonant circuit, and wherein said mark frequency applying means includes a filter for passing said mark frequency and an amplifier.

4. A tuning indicator in accordance with claim 1, wherein said first and second selective means each comprises a resonant circuit, wherein said mark frequency applying means includes a filter for passing said mark frequency and an amplifier, and wherein said space frequency applying means includes a filter for passing said space frequency and an amplifier.

5. A tuning indicator for a frequency shift telegraphy receiver adapted to receive alternatively-present signals of one frequency representing mark and signals of another frequency representing space, comprising first selective means for passing signals of mark frequency and attenuating signals of space frequency, second selective means for passing signals of space frequency and attenuating signals of mark frequency, means for applying signals of mark frequency to said first selective means, means for applying signals of space frequency to said second selective means, a cathode ray tube having means for producing an electron beam, deflecting means operative on said beam, and receptive of the output of said first selective means, for deflecting said beam linearly in one direction in accordance with the output of said first selective means, and deflecting means operative on said beam, and receptive of the output of said second selective means, for deflecting said beam linearly in another direction in accordance with the output of said second selective means.

6. A tuning indicator for a frequency shift telegraphy receiver adapted to receive alternatively-present signals of one frequency representing mark and signals of another frequency representing space, comprising first selective means for passing signals of mark frequency and attenuating signals of space frequency, second selective means for passing signals of space frequency and attenuating signals of mark frequency, means for applying signals of mark frequency to said first selective means, means for applying signals of space frequency to said second selective means, a cathode ray tube having means for producing an electron beam, deflecting means operative on said beam, and receptive of the output of said first selective means, for deflecting said beam linearly in one direction in accordance with the output of said first selective means, and deflecting means operative on said beam, and receptive of the output of said second selective means, for deflecting said beam linearly in another direction in accordance with the output of said second selective means, said other direction making an acute angle with said one direction.

7. A tuning indicator for a frequency shift telegraphy receiver adapted to receive alternatively-present signals of one frequency representing mark and signals of another frequency representing space, comprising first selective means for passing signals of mark frequency and attenuating signals of space frequency, second selective means for passing signals of space frequency and attenuating signals of mark frequency, means for applying signals of mark frequency to said first selective means, means for applying signals of space frequency to said second selective means, a cathode ray tube having means for producing an electron beam and having a plurality of deflecting electrodes, means connecting the output of said first selective means to one combination of electrodes to produce deflection of said beam in one sense, and means connecting the output of said second selective means to a different combination of electrodes to produce deflection of said beam in another sense.

8. A tuning indicator for a frequency shift telegraphy receiver adapted to receive alternatively-present signals of one frequency representing mark and signals of another frequency representing space, comprising first selective means for passing signals of mark frequency and attenuating signals of space frequency, second selective means for passing signals of space frequency and attenuating signals of mark frequency, means for applying signals of mark frequency to said first selective means, means for applying signals of space frequency to said second selective means, a cathode ray tube having means for producing an electron beam and having four orthogonally-related deflecting electrodes, means connecting the output of said first selective means to two electrodes in space quadrature to produce linear deflection of said beam in one direction, and means connecting the output of said second selective means to two other electrodes in space quadrature to produce linear deflection of said beam in another direction.

9. A tuning indicator for a frequency shift telegraphy receiver adapted to receive alternatively-present signals of one frequency representing mark and signals of another frequency representing space, comprising first selective means for passing signals of mark frequency and attenuating signals of space frequency, second selective means for passing signals of space frequency and attenuating signals of mark frequency, means for applying signals of mark frequency to said first selective means, means for applying signals of space frequency to said second selective means, a cathode ray tube having means for producing an electron beam and having four orthogonally-related deflecting electrodes, means for applying the entire voltage output of said first selective means to one electrode and only a portion of such voltage to another electrode in space quadrature relation to said one electrode, thereby to produce linear deflection of said beam in one direction, and means for applying the entire voltage output of said second selective means to still another electrode and only a portion of such voltage to an electrode in space quadrature relation to said last-mentioned electrode, thereby to produce linear deflection of said beam in another direction.

10. A tuning indicator as defined in claim 9, wherein said one electrode and said last-mentioned electrode are oppositely disposed with respect to the electron beam.

11. A tuning indicator as defined in claim 9, wherein said one electrode and said last-mentioned electrode are oppositely disposed with respect to the electron beam, and wherein the portions of the voltage outputs of the first and second selective means are applied to the same electrode.

12. A tuning indicator in accordance with claim 9, wherein said mark frequency applying means includes a filter for passing said mark frequency and an amplifier, and wherein said space frequency applying means includes a filter for passing said space frequency and an amplifier.

BERTRAM A. TREVOR.

REFERENCES CITED

The following references are of record in the file of this patent:

UNITED STATES PATENTS

| Number | Name | Date |
|---|---|---|
| 2,233,751 | Seeley | Mar. 4, 1944 |
| 2,477,963 | Chapin | Aug. 2, 1949 |

FOREIGN PATENTS

| Number | Country | Date |
|---|---|---|
| 891,937 | France | Mar. 23, 1944 |